July 20, 1937.   T. J. DYKEMA   2,087,374
FITMENT
Filed April 19, 1935
Fig. 1.
Fig. 2.
Fig. 3.
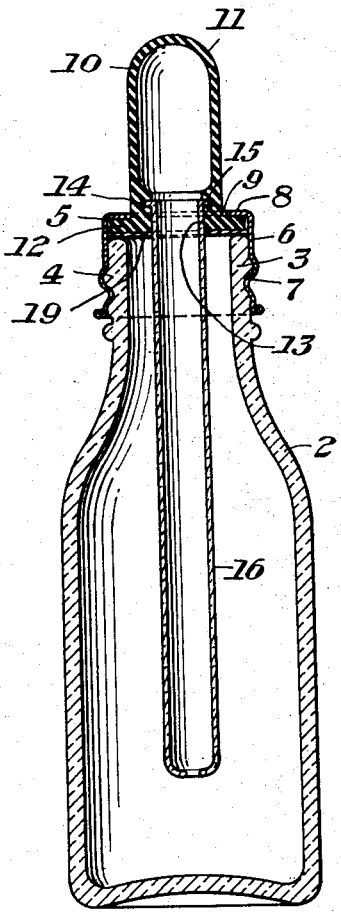
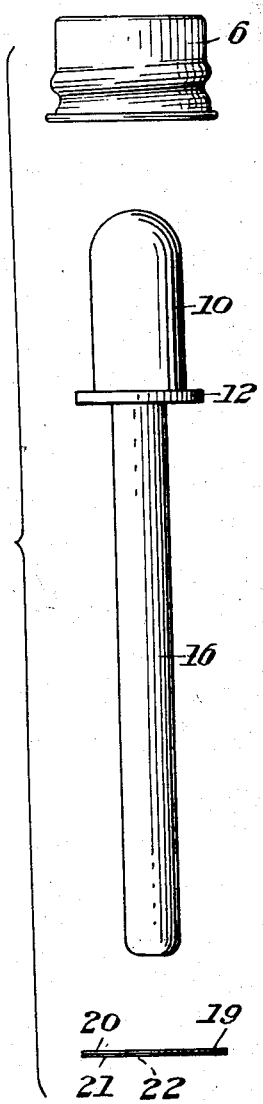
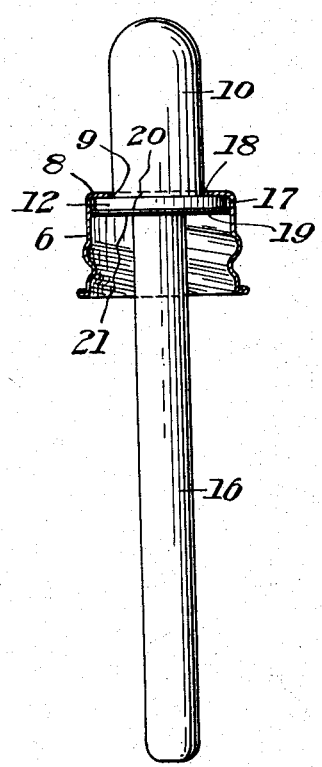
INVENTOR Patented July 20, 1937

2,087,374

UNITED STATES PATENT OFFICE 2,087,374

FITMENT

Tunis J. Dykema, Pittsburgh, Pa.

Application April 19, 1935, Serial No. 17,209

8 Claims. (Cl. 221—148)

This invention relates broadly to fitments for bottles and the like, and more particularly to fitments comprising a closure member for the bottle or the like and an applicator adapted to extend within the bottle. For example, a fitment of this character is disclosed in my reissue patent No. 19,520, reissued April 9, 1935.

In my said reissue patent there is disclosed a unitary fitment having an applicator of the type comprising a rubber bulb member and a dropper tube engaged therewithin and extending downwardly therefrom in which the rubber bulb member fits tightly within the cap, either at the periphery of the flange of the bulb member or at the periphery of the portion thereof above the flange where the bulb member passes through the hole in the top of the cap, or both. Such fitment has proved extremely satisfactory in use, although when a fitment including a rubber part is used in connection with oily substances such substances have a tendency to cause the rubber to swell.

It is advantageous when providing a fitment for use in connection with oily substances to allow clearance to permit of some swelling of the rubber after contact with the oily substance, particularly in fitments utilizing a perforated sheet metal cap through which the rubber part or bulb member extends, as there is danger that the portion of the bulb member lying within the perforation in the cap will upon swelling be cut by the relatively sharp edge surrounding the hole. Also it is desirable to leave clearance between the periphery of the flange of the rubber part and the interior of the skirt of the cap whether or not a portion of the rubber part extends upwardly through a hole in the top of the cap, as this promotes ease of assembly and avoids undue binding and possible distortion of the flange within the cap upon swelling of the rubber.

It is therefore advantageous in the provision of fitments employing rubber parts for use in connection with oily substances to use bottle closure members or caps and rubber parts which fit together loosely or with clearance therebetween to permit swelling of the rubber. However, this has the disadvantage that the fitment cannot conveniently be handled as a unit, at least prior to swelling of the rubber, as the cap may inadvertently be removed from the bottle separately from the applicator, leaving the applicator in place therein, or if the cap and applicator are removed together there is danger that they will come apart or become separated, resulting in inconvenience.

I provide a fitment obviating the disadvantages above mentioned. I make provision for clearance between the periphery of the flange of the rubber part and the interior of the skirt of the cap and also, in fitments in which the rubber part extends through a perforation or hole in the cap, for clearance between the portion of the rubber part lying immediately within the hole and the edge surrounding the hole but without the disadvantage that the cap and applicator or rubber part will come apart in ordinary handling of the fitment. The cap and rubber part may within the scope of the present invention be maintained together, whereby to adapt the fitment to be handled as a unit, in various ways. I preferably provide the fitment with means extending laterally from the applicator (which term "applicator" is used in the specification and claims, unless the context plainly requires otherwise, to comprehend either the applying rod, tube, brush, etc., alone or such applying member in combination with holding means such as a rubber part if such means are used) and cooperating with the cap to maintain the cap and applicator together. I normally employ a flanged applicator and ordinarily the applicator has a rubber flange extending within the cap. In such cases I provide means extending laterally from the applicator and cooperating with said flange to maintain the cap and applicator together.

It is manifestly impracticable to attempt to describe all the possible embodiments of the invention or even all those embodiments which are preferred. Purely for purposes of illustration and description I have shown the invention as embodied in a fitment employing an applicator in the form of a dropper comprising a resilient bulb member and a dropper tube engaged therewithin and extending downwardly therefrom, the bulb member having a flange adapted to extend within the cap, and separate means for maintaining the applicator and cap together. Such separate means in the embodiment shown comprises a liner or washer in the form of a thin perforate disc adapted to engage the cap to hold the applicator in assembled relationship therewith. The liner is positioned so as to seal the bottle when the fitment is applied thereto.

Other details, objects and advantages of the invention will become apparent as the following description of a present preferred embodiment thereof proceeds.

In the accompanying drawing I have shown a present preferred embodiment of the invention, in which Figure 1 is a central vertical cross-sectional view through a bottle having a fitment applied thereto;

Figure 2 is an exploded view of the fitment; and

Figure 3 is an elevational view of the fitment having the parts thereof assembled and with the cap in central vertical cross section.

Referring more particularly to the drawing, there is shown a glass bottle 2 having a reduced neck 3 provided with the usual external screw threads 4. Applied to the bottle is a fitment designated generally by reference numeral 5 and which comprises a bottle cap 6 shown as being made of sheet metal and which comprises a skirt portion 7 which is interiorly threaded to adapt it to be screwed down on the neck of the bottle and a top portion 8 adapted to overlie the top or rim of the bottle. In the particular form shown in the drawing the top 8 of the cap 6 has a circular central opening 9 therethrough which loosely receives the upper portion 10 of a rubber part or bulb member designated generally by reference numeral 11 and which also comprises an outwardly projecting annular flange 12 lying within the skirt portion of the cap and against the under side of the top portion thereof. The flange 12 is loosely received within the cap. The flange 12 has a central hole 13 therethrough which communicates with the interior of the portion 10 of the rubber part or bulb member, and opening into the wall surrounding such hole is an annular recess 14 adapted to receive an outwardly extending annular flange 15 at the upper extremity of a hollow glass dropper tube 16, whereby the dropper tube is held in assembled relationship with the bulb member.

Clearance 17 is provided between the periphery of the flange 12 and the interior of the skirt of the cap and clearance 18 is provided between the periphery of that part of the portion 10 of the bulb member which lies immediately within the hole 9 when the parts are assembled and the material of the cap surrounding the hole. Thus the fit between the rubber part or bulb member, and, consequently, the applicator, and the cap is relatively loose and such that in the absence of some provision to the contrary the applicator and cap will not remain together as a unit at all times. However, the clearance provided at 17 and 18 allows for substantial swelling of the rubber before binding between the rubber and the cap or cutting of the rubber by the material of the cap surrounding the hole 9 will occur. Such clearance may be made as great or as small as may be deemed desirable. A relatively small clearance is shown in the drawing.

There is provided a liner or washer 19 in the form of a perforate disc which is shown as comprising a paper backing 20 and a protective facing 21 of suitable material as, for example, tin foil, lead foil, "Cellophane", etc. The backing and facing materials may be connected by any suitable adhesive. The liner 19 has a central circular hole 22 therethrough, which hole is preferably of such size as to snugly receive the dropper tube 16. The diameter of the liner 19 is greater than the diameter of the flange 12 and in fact is preferably made slightly greater than the internal diameter of that part of the skirt portion of the cap within which it is adapted to lie for a reason which will presently appear.

The parts of the fitment are assembled as shown in Figure 3, the portion 10 of the rubber part or bulb member being introduced through the skirt portion of the cap and through the hole 9 in its top until the upper surface of the flange 12 lies against the lower surface of the top portion 8 of the cap. The liner 19 is slid over the dropper tube 16 and is also introduced into the skirt portion of the cap until it lies against the lower surface of the flange 12. As the diameter of the liner is at least as great as and preferably slightly greater than the internal diameter of the skirt portion of the cap, the liner fits frictionally within the cap and is under transverse pressure. The liner is preferably made of material of sufficient stiffness to withstand the pressure to which it is normally subjected in use. The liner as a whole may be slightly bowed upon insertion into the cap or the edge of the liner may be somewhat curled. Any such bowing or curling, however, would be very slight.

The liner 19 cooperates with the flange 12 of the rubber part and with the cap to maintain the cap and applicator together whereby to adapt the fitment to be handled as a unit. The parts of the fitment will remain together substantially as shown in Figure 3 in ordinary usage. When the fitment is applied to the bottle the outer portion of the liner is compressed between the outer portion of the flange and the top rim of the bottle and serves to seal the bottle. This also serves to maintain the liner in proper position within the cap.

In addition to maintaining the cap and applicator together as a unit the liner 19 also has the further advantage that it shields the contents of the bottle from the rubber. This shield will ordinarily be quite effective, although some of the contents of the bottle will probably ultimately seep through and contact the rubber. However, there is less likelihood of the rubber contaminating the contents of the bottle than were the latter not used. Furthermore, if the bottle is used for containing an oily substance the liner protects the rubber from the oily substance.

While I have shown and described a present preferred embodiment of the invention, it is to be distinctly understood that the same is by no means limited to such embodiment but may be otherwise variously embodied within the scope of the following claims.

I claim:

1. A fitment for bottles and the like comprising a closure cap for the bottle, the cap having a hole in its top, and a flanged applicator having an upward extension within the hole in the cap and a flange extending loosely within the cap, the applicator being adapted to extend within the bottle when the cap is applied thereto, the fitment having means separate from the cap and from the applicator engaging the bottom of the applicator flange maintaining the cap and applicator together whereby to adapt the fitment to be handled as a unit, said last mentioned means being so constructed and arranged as to seal the bottle when the fitment is applied thereto.

2. A fitment for bottles and the like comprising a closure cap for the bottle, an applicator having a flange extending within the cap, the applicator being adapted to extend within the bottle with the flange overlying the bottle rim when the cap is applied to the bottle, and a liner underlying the flange and engaging the cap to maintain the cap and applicator together whereby to adapt the fitment to be handled as a unit, the liner being so constructed and arranged as to seal the bottle when the fitment is applied thereto.

3. A fitment for bottles and the like comprising a closure cap for the bottle, the cap having a downwardly extending skirt portion and a top having a hole therein, an applicator having a resilient bulb member disposed with a portion extending within the hole in the top of the cap and a flange lying against the under side of the top of the cap and of less diameter than the internal diameter of the skirt portion of the cap and adapted to overlie the bottle rim when the cap is applied to the bottle and a dropper tube engaged within and extending downwardly from the bulb member and adapted to extend within the bottle when the cap is applied thereto, and a liner underlying the flange and of greater diameter than the flange so as to adapt the liner to engage the interior of the skirt portion of the cap to maintain the cap and applicator together whereby to adapt the fitment to be handled as a unit, the liner being so constructed and arranged as to seal the bottle when the fitment is applied thereto 4. A fitment for bottles and the like comprising a closure cap for the bottle, an applicator extending within the cap and adapted to extend within the bottle when the cap is applied thereto, resilient sealing means within the cap for cooperation with the bottle when the cap is applied, and separate means also extending within and cooperating with the cap for maintaining the cap and applicator together whereby to adapt the fitment to be handled as a unit, said last mentioned means being of readily deformable material and lying between said sealing means and the bottle when the cap is applied.

5. A fitment for bottles and the like comprising closure means for the bottle and a flanged applicator loosely fitted to the closure means and adapted to extend within the bottle when the closure means are applied thereto, the fitment having a retaining device of soft material separate from the closure means cooperating with a flange of the applicator and the closure means to maintain the closure means and applicator together whereby to adapt the fitment to be handled as a unit, a flange of the applicator and said retaining device being so constructed and arranged as to cooperate to seal the bottle when the closure means are applied.

6. A fitment for bottles and the like comprising a closure cap for the bottle, an applicator having a portion extending within the cap, said portion of the applicator being of relatively small compass as compared with the interior of the cap so that it lies loosely within the cap, and a liner cooperating with the cap and applicator and holding the applicator in place with respect to the cap, said liner being made of readily deformable material and being positioned so that upon application of the fitment to the bottle it lies against the bottle lip.

7. A fitment for bottles and the like comprising closure means for the bottle, an applicator having a portion adapted to extend within the bottle upon application of the fitment thereto and a portion extending within and with its upper surface lying against the closure means, said last mentioned portion of the applicator being of relatively small compass as compared with the interior of the closure means so that it lies loosely within the closure means, and a round disc separate from the closure means and from the applicator and fitted to the closure means throughout its periphery for maintaining the closure means and applicator together whereby to adapt the fitment to be handled as a unit, said disc being the sole means for maintaining the closure means and applicator together.

8. A fitment for bottles and the like comprising a closure cap for the bottle and an applicator having at its upper portion a flange which is of relatively small compass as compared with the interior of the cap so that it lies loosely within the cap, the applicator being adapted to extend within the bottle when the cap is applied thereto, the fitment having means separate from the cap and from the applicator engaging the bottom of the applicator flange maintaining the cap and applicator together whereby to adapt the fitment to be handled as a unit, said last mentioned means being made of readily deformable material and being positioned so that upon application of the fitment to the bottle it lies against the bottle lip.

TUNIS J. DYKEMA.